May 13, 1952 K. G. JOHNSON ET AL 2,596,245

SIGNAL SENDING DEVICE WITHIN AUTOMATIC TELEPHONE SYSTEM

Filed Dec. 28, 1948

INVENTORS
KARL GEORG JOHNSON
NILS VALDEMAR HOFSTRAND

BY Leech & Radue

ATTORNEYS

Patented May 13, 1952 2,596,245

UNITED STATES PATENT OFFICE 2,596,245

SIGNAL SENDING DEVICE WITHIN AUTOMATIC TELEPHONE SYSTEM

Karl Georg Johnson and Nils Valdemar Hofstrand, Stockholm, Sweden, assignors to Telefonaktiebolaget L M Ericsson, Stockholm, Sweden, a company of Sweden Application December 28, 1948, Serial No. 67,584
In Sweden January 9, 1948

2 Claims. (Cl. 179—18)

In telephone networks with local traffic as well as toll traffic, communications of different kinds, e. g. local and toll communications, are carried over the same lines. Inasmuch as different conditions are needed for different kinds of communications, signals indicating the kind of communication must be sent over the lines. The present invention refers to a method for transmission of such signals from a calling to a called telephone exchange.

This is achieved, at automatic telephone exchanges with registers, in which different kinds of communications are forwarded under control of the same sending register at the called exchange by certain impulse series e. g. the first or the last in a subscriber's number sent at the setting for a communication of one kind and not containing more than at the most a certain number of impulses determined beforehand for all such communications. For another kind of communication there is provided at least one of said impulse series which comprises a determined further number of impulses or a multiple of said further number, which number is at least as great as the first mentioned number.

By means of this invention a number of different signals can be produced. For each impulse series corresponding to a figure and transmitted from the initiating exchange for a communication to its end exchange, it is possible to add e. g. 10 impulses, which means different signals, e. g. that the communication is a toll call if the signal comes at the first received impulse series, or that all the figures have been sent if the signal comes at the last received impulse series. Both signals can be applied to the last series of impulses by having an addition of 10 impulses marking that all the figures have been sent and an addition of 20 impulses marking additionally, that the communication is a toll call. It is evident that a great number of different signals can thus be produced.

The invention will be described below in its simplest embodiment with reference to the accompanying drawings Figs. 1–3.

Figure 1:
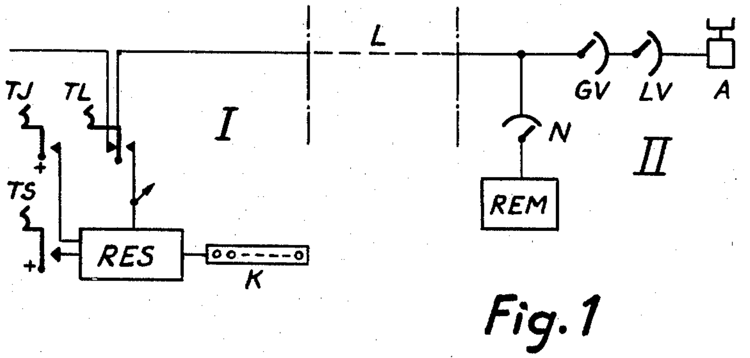
Fig. 1 shows a general diagram of a connection between a toll exchange and a local exchange.
Figure 2:
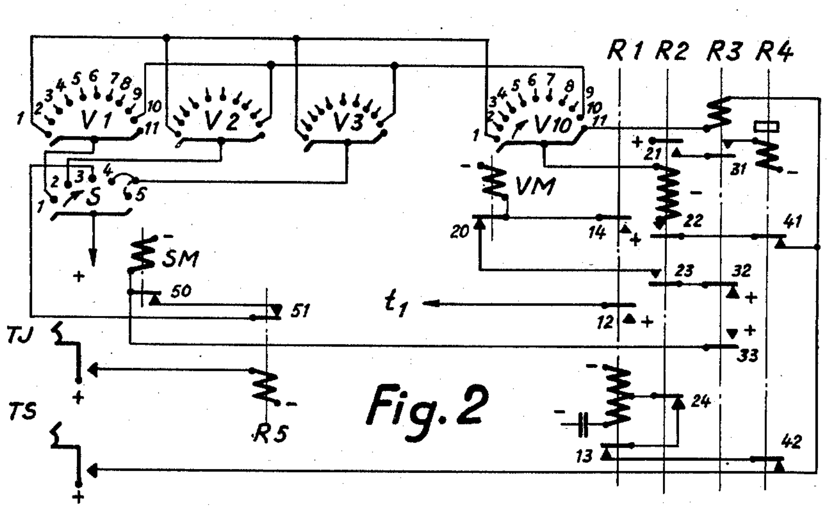
Fig. 2 shows the necessary devices in a toll register for sending of signals according to the invention.

In Fig. 1, L is a junction line or a series of junction lines interconnected by means of selectors connecting a telephone exchange I with a telephone exchange II. Local as well as toll communications are supposed to be set over line L under control of an operator. At the setting of a communication, the line L is connected to a sending register RES by means of a push button TL. The number of the called subscriber A is dialled on the keyset K and registered in the register RES. After all the figures having been dialled the push button TS is pressed down, whereafter impulse series corresponding to at least a part of the dialled figures are emitted over the line L to the receiving register REM in the called exchange II. Register REM then sets the selectors GV and LV, whereby the connection between the exchange I and the subscriber A has been completed. If the communication is to be considered as a toll call and have the preference before local calls in the exchange II, the operator presses the push button TJ before the push button TS is actuated whereby such a connection of the register RES is obtained, that the last impulse series is increased with 11 impulses. Fig. 2 shows how this is rendered possible. We suppose that RES is a register for three digits. The three digits are registered in the selectors V1—V3, all of which have 11 positions and at rest are in their 11th position. When the push button TS is pressed down the following circuits are closed: (*a*) +, push button TS, winding on relay R3, the 11th position of selector V10, winding on relay R2 to negative. The winding of relay R3 has a high resistance, whereby relay R2 does not attract its armature. Relay R3, on the other hand, actuates the contacts 31—33. The magnet SM of the selector S receives current over contact 33 and attracts its armature. The selector S is driven step-by-step, and its brush-set moves when the driving magnet SM releases its armature after a current impulse (*b*) +, push button TS, contacts 42, 13 and 24, winding on relay R1 to negative. Relay R1 is provided with two windings counteracting each other, of which one is connected in series with a condenser. It is thereby obtained, that the relay attracts its armature with some delay and also releases its armature with some delay after make. Relay R1 attracts its armature and the contacts 12—14 are actuated. The driving magnet VM receives current over contact 14 and attracts its armature. The magnet VM pertains to the selector V10, which is of the same construction as selector S. Relay R1 has a self-interrupter 13 and will therefore break and make repeatedly and send current impulses over the contacts 12 and 14. After the first impulse sent by relay R1 the brushes of selector V10 move one step. The circuit over its 11th position through relay R3 is broken. Relay R3 releases its armature. Contact 33 breaks the current for magnet SM, the brushes on selector S are moved to position 1. If the selector V1 is set in position 1, the following circuit is closed: +, selector S position 1, selector V1 position 1, selector V10 position 1, winding on relay R2 to negative. Relay R2 attracts its armature. Contacts 21—24 are actuated. Relay R2 is self-held over contact 22 and contact 41. The impulse sending from relay R1 is broken by contact 24. Selector V10 is driven to position 11 by magnet VM, which receives current over the self-interrupter 20 and contacts 32 and 23. When the brushes of selector V10 reach position 11, relay R3 attracts its armature. Contact 32 breaks the current for driving magnet VM. Relay R4, which is slow-releasing, receives current over contacts 21 and 31 and attracts its armature. Contacts 41—42 are actuated. The holding circuit for relay R2 is broken by contact 41. Since relay R3 has a high resistance, relay R2 releases its armature. Contact 33 closes the circuit for magnet SM and prepares the move of selector S to position 2. After a short interval, which represents the interval between the first and the second sent figures, relay R4 releases its armature, whereafter the sending of the next figure is begun by relay R1 being energized.

If the selector V1 is not in position 1 but in some other position, e. g. 5, the connecting process described above will be postponed until selector V10 has stepped to position 5 by means of impulses from contact 14 on relay R1. Impulses simultaneously come over contact 12 and wire t1 to the line L and the register REM in Fig. 1.

For each impulse series, which is sent, the selector S is moved one step. When the third and last impulse series is beginning, selector S is in position 2 and relay R3 and magnet SM keep their armatures attracted. After the end of the first impulse the selector S steps to position 3, but immediately move to position 4 if the push button TJ is not pressed down, due to the magnet SM receiving current over position 3 in selector S, contact 51 and the self-holding contact 50. When selector S stands in position 4, relay R2 receives current as soon as selector V10 has stepped to the position corresponding to the setting of selector V3.

If however the communication is a toll call, the operator has pressed the button TJ and relay R5 has attracted its armature so, that contact 51 is actuated. When the selector S reaches position 3, it is not moved to position 4 until V10 has passed its 11th position, whereby relay R3 attracts its armature and contact 33 is closed for a moment. Selector S thereby moves to position 4 simultaneously with selector V10 leaving its 11th position. Hereafter as many impulses are sent, as correspond to the setting of the selector V3. The last impulse series will thereby comprise 11 impulses more than is required for the indication of the last figure.

In relay systems, the selector V10 is replaced by a relay chain, which can be momentarily moved back to its initial position after 10 impulses, whereby an addition of 10 impulses more than is required for the indication of the last figure in this case is given which is more suitable than 11 impulses. If the brush of the selector V3 is connected to position 5 in selector S instead of to position 4, a further signal can be obtained in relation to the last figure, e. g. indicating that all the figures have been sent, which is necessary if the number of figures varies at different communications and there is no other signal indicating to the register REM when it can disconnect itself from the connection. It is thus obtained, that at least 11 additional impulses are always added at sending of the last figure and, if furthermore the push button TJ is pressed down, the selector V10 must pass the position 11 twice, once to move the selector S from position 3 to position 4, and once to move it from position 4 to position 5. 22 additional impulses will thereby be sent in relation with the last figure.

Figure 3:
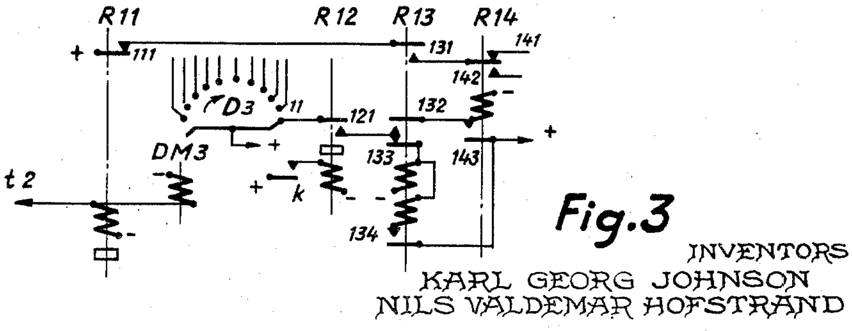
Fig. 3 shows the necessary receiving devices for the signals in a local register, setting local as well as the local part of toll communication.

Fig. 3 shows the impulse receiving device for the third figure in the register REM in Fig. 1. From an impulse receiving relay, which is not shown in the figure, the impulses coming in over line L are transmitted to wire t2 and the driving magnet DM3 for a step-by-step driven selector D3 with 11 positions, of which position 11 is the initial position. At the beginning of the first impulse, the slow-releasing relay R11 attracts its armature and remains attracted during the impulse series. Contact 111 is actuated. Selector D3 is set in a position corresponding to the impulse series. When selector D3 leaves its 11th position, a contact k is closed, which remains closed until the selector returns to position 11. The slow-releasing relay R12 receives current over contact k and attracts its armature. Contact 121 is closed. If the impulse series comprises more than 11 impulses, the relay R13 is closed when selector D3 passes position 11, through the following circuit: +, contact brush of selector D3, position 11, contacts 121 and 133, winding on relay R13 to negative. Relay R13 attracts its armature, contact 134 is closed, but the relay cannot attract wholly before selector D3 has left position 11 whereby the following circuit is closed: + from a contact on a holding relay which is not shown in the figure, contact 134, both the windings on relay R13 in series, to negative. Relay R13 actuates the contacts 131—133. If 11 more impulses are coming in, relay R14 will attract its armature when selector D3 passes position 11 for the second time. Contacts 141—143 are thereby actuated and relay R14 is self-held.

After the end of the impulse series, relay R11 releases its armature and a circuit is closed over the contacts 111, 131 and 141 or 142 depending on if 11 or 22 additional impulses have been received. This circuit represents the signal transmitted together with the third figure.

The connection shown in Fig. 3 can naturally be arranged for any figure in the register REM, whereby the purpose of the signals can be chosen according to need.

We claim:

1. In telephone systems of the type including a first exchange, a second exchange, a junction line joining said exchanges; in said first exchange a sender containing a register mechanism, means for setting said register mechanism in accordance with a called subscriber's telephone designation, means for connecting said sender to said junction line, means in said sender for sending impulse series representing the subscriber's telephone designation registered in said register mechanism over said junction line; in said second exchange subscriber's lines, selectors and a register for setting communications to said subscriber's lines over said selectors, means for connecting said second register to said junction line by a call from said first exchange and registering means in said second register set by the impulse series sent by said sender; the combination there-with of means for sending signals indicating the kind of communication comprising in said sender control means having a number of contact positions and arranged to successively engage all said positions for each impulse series and a relay connected to be energized from each impulse series by said control means engaging one of said positions marked by said first exchange register mechanism; signalling means for causing additional impulses in at least one of said impulse series, said signalling means being connected to render said relay ineffective temporarily whereby said control means passes all its positions a number of times, means cooperating with said signalling means for rendering said relay effective after said control means has passed all its positions the number of times determined by said signalling means; and means in said second register for recording the number of additional impulses.

2. In an automatic telephone system as described in claim 1, means for causing 11 additional impulses in at least one of said impulse series and 22 additional impulses in the same said impulse series in a subscriber's telephone designation.

KARL GEORG JOHNSON.
NILS VALDEMAR HOFSTRAND.

REFERENCES CITED

The following references are of record in the file of this patent:

UNITED STATES PATENTS

| Number | Name | Date |
| --- | --- | --- |
| 1,729,856 | Tench | Oct. 1, 1929 |
| 1,882,106 | Wise | Oct. 11, 1932 |
| 1,901,156 | Gillings | Mar. 14, 1933 |
| 1,903,019 | Wright | Mar. 28, 1933 |
| 2,107,988 | Kardorff | Feb. 8, 1938 |
| 2,374,884 | Newby | May 1, 1945 |
| 2,467,490 | McClew | Apr. 19, 1949 |

FOREIGN PATENTS

| Number | Country | Date |
| --- | --- | --- |
| 489,545 | Great Britain | July 25, 1938 |